United States Patent Office 3,708,444
Patented Jan. 2, 1973

3,708,444
FOAMED AND FOAMABLE COPOLYMERS
Wolfgang Ganzler, Darmstadt, Gunter Schroder, Ober-Ramstadt-Eiche, and Peter Huch, Buchschlag Uber Sprendlingen, Germany, assignors to Rohm & Haas G.m.b.H., Darmstadt, Germany
No Drawing. Continuation of abandoned application Ser. No. 682,496, Nov. 13, 1967. This application May 19, 1971, Ser. No. 145,038
Int. Cl. C08f 29/34, 47/10
U.S. Cl. 260—2.5 N
10 Claims

ABSTRACT OF THE DISCLOSURE

Improvement in the stability to water of foamed copolymers of (A) acrylic or methacrylic acid and (B) acrylonitrile, acrylamide, methacrylonitrile or methacrylamide and, if desired, (C) additional comonomer in the presence of 3 to 20 percent urea or dimethylurea by addition of 0.01 to 10% by weight of a cross-linking agent to the monomer mix before copolymerization.

---

The present application is a continuation of application Ser. No. 682,496 filed Nov. 13, 1967 (and now abandoned).

This invention relates to improvements in the heat-foamable, thermoplastic copolymers described in copending application Ser. No. 487,032 filed Sept. 13, 1965, (and now abandoned) to the heat-foamed copolymers prepared therefrom, and to improvements in the method of preparing such copolymers.

The copolymers described in said copending application are prepared by copolymerizing, in the presence of 3 to 20 percent by weight urea or N,N'dimethylurea and an organic radical-forming copolymerization catalyst, (A) 10 to 60 percent by weight acrylic acid, methacrylic acid or a combination thereof with (B) 20 to 60 percent by weight acrylonitrile, acrylamide, methacrylonitrile, methacrylamide or a combination thereof and, optionally, (C) up to about 60 percent by weight of one or more compounds copolymerizable with said comonomers, e.g., styrene, α-methyl styrene, lower alkyl (particularly methyl and butyl) acrylates and methacrylates, vinyl acetate, itaconic acid, esters thereof, itaconic acid amide or nitrile, and polymerizable heterocyclic compounds such as vinyl pyridine or N-vinyl-2-pyrrolidone, and D) up to about 5 percent by weight of water. Heat-foamable copolymers are obtainable by heating the monomer mixture to 20 to about 120° C. and these are foamed by subsequent heating to about 150° to 250° C.

The copolymerization of the monomers to an unfoamed, thermoplastic copolymer is carried out, in the presence of a catalyst, at a temperature within the range of about 20 to 100° C., depending upon a number of factors, particularly the effectiveness of the catalyst chosen for the copolymerization. Temperatures of at least about 40° C. are desirable to avoid unduly prolonged copolymerization times and generally poor results. Temperatures of about 50° to 60° C. are preferred for uniformly excellent results. The time of copolymerization varies widely and is readily ascertainable by trial and error. At the preferred temperature of 50 to 60° C., 30 to 80 hours are ordinarily sufficient.

Under such conditions about 80% of the monomers copolymerize to yield solid copolymers in which the remaining monomers are dissolved. These monomers are also polymerizable in accordance with conventional practice by tempering the solid copolymer at a somewhat higher temperature, e.g., about 100° to 120° C. for usually about one to four hours, whereby completely copolymerized, solid, thermoplastic bodies such as plates are obtained which can then be foamed as such or after granulation.

While the foamed copolymers thus obtained have a very desirable combination of properties in that they have high thermal dimensional stability, low density and good hardness, bending or flexural strength, impact strength, notched-bar impact strength, tensile strength and compression strength, they often have the disadvantage of shrinking upon contact with water, occasionally even in highly humid air. This deficiency can be minimized somewhat but not eliminated by selecting, as comonomer C, a hydrophobic comonomer such as styrene or butyl methacrylate. Furthermore, a further disadvantage of such foamed copolymers is that the foam density obtainable at atmospheric pressure is determined solely by the concentration of urea in the comonomer mix. This cannot be reduced to any desired extent, however, because of the dual function of the decomposition products of urea as blow gas and acrylimide- or methacrylimide-forming cyclizing agent. Since one function cannot very well be reduced without also reducing the other, it is understandably difficult to obtain foams of relatively high density simply by reducing the concentration of urea in the mix.

It has now been found that these disadvantages can be avoided by adding to the monomer mix of urea and comonomers A, B and optionally C, before commencement of the polymerization, a cross-linking agent having at least two terminal reactive groups such as vinyl, vinylidene, methylolamide, lower alkoxy-methylamide and epoxy groups. The unfoamed copolymers thus obtained are or are not cross-linked, depending upon the cross-linking agent that is chosen. However, they are in any case converted to cross-linked, foamed bodies upon being heated to over 180° C. These foamed and cross-linked copolymers are stable to the action of water and atmospheric humidity. The density of the foam can be chosen within wide limits by a choice of the concentration of cross-linking agent without affecting the concentration of urea in the initial monomer mix.

The compounds useful as cross-linking agents contain at least two reactive groups, which may be identical or different. Compounds having identical reactive groups include well-know polymerizable cross-linking agents (a) having terminal ethylenic groups, such as ethylene glycol dimethacrylate, butanediol - 1,4 - dimethacrylate, divinylbenzene, triallylcyanurate, allylacrylate, diallylether, diallylphthalate and the like, (b) having terminal methyloi groups, e.g., carbamide resin precondensates such as hexamethylolmelamine, the hexaalkylethers thereof, and more highly condensed, preferably etherified reaction products of urea, melamine, guanidine or ethylene urea with formaldehyde or other low molecular weight aldehydes, and (c) commercially available an epoxy resins and polyepoxy compounds, e.g., those prepared from epichlorohydrin and di - (hydroxyphenyl) - dimethyl methane (Bisphenol A). The most valuable representatives of the cross-linking agents with different reactive groups that are useful in accordance with the invention are such compounds as glycidyl acrylate, glycidyl methacrylate and the lower alkylol- and lower alkylol ether-acrylamides and methacrylamides, e.g., methoxymethyl acrylamide and butoxymethyl methacrylamide.

Of the cross-linking agents referred to above, only those containing two or more vinyl- or vinylidene groups in the molecule lead directly to cross-linked polymers. The concentration of such cross-linking agents in the comonomer mix is preferably between about 0.01 and 3% and is, in any event, maintained sufficiently low to allow the desired degree of foaming.

All other cross-linking agents, to the extent that hardening catalysts are not already present during polymerization, lead to cross-linking only at the foaming temperature, i.e., above 180° C. They can be utilized in appreciably higher concentrations, e.g., up to about 10% by weight, but are effective in concentrations as low as 0.01%. It is to be understood, of course, that larger concentrations of cross-linking agents are required to provide a given cross-linking when the cross-linking agent is a high molecular weight compound inasmuch as the degree of cross-linking depends on the total number of active groups present. Thus, for example, no additional improvements in the properties of the final foamed product are obtained by the use of more than about 5% by weight methoxymethyl methacrylamide or other polymerizable amino methylol compounds, or radical-polymerizable epoxy compounds, whereas resinous cross-linking agents in concentrations between about 5 and 10% result in some further improvement in the properties of the final foam over and above those obtainable by employing less than 5% resinous cross-linking agent.

There is no need to alter the process of preparing the copolymers or the final foamed copolymers other than by addition of the cross-linking agent to the intial comonomer mix. The additional incorporation of such materials as silica gel, powdered asbestos or soluble vinyl polymers, which improve the uniformity of foaming as described in copending application Ser. No. 655,766 filed July 25, 1967, now U.S. 3,558,531 granted Jan. 26, 1971, is also advantageous in the process of this invention.

In addition to the high stability to water and atmospheric humidity, the foamed copolymers of the present invention have improved mechanical properties, e.g., tensile strength and bending strength, as compared with foamed copolymers previously obtained from the comonomers A, B and C. The density of the foam is capable of being varied between about 30 and 250 grams per liter by a choice of the concentration and type of cross-linking agents employed in the process.

These and other advantages are further described in the following examples illustrating the best modes of practicing the invention. In these examples, parts by weight are expressed as "p.b.w." and density is expressed in grams per liter, "g.p.l."

EXAMPLE 1

A mixture of 55 p.b.w. methacrylonitrile, 45 p.b.w. methacrylic acid, 2 p.b.w. triallylcyanurate, 10 p.b.w. urea and 0.2 p.b.w. azoisobutyronitrile is polymerized for 48 hours at 50° C. and then tempered at 100° C. Plates of this copolymer having a thickness of 8 mm. are foamed to a density of 40 g.p.l. by heating to 210° C. for two hours to a foamed plate having thermal stability at over 250° C., a tensile strength of 10.8 kp./cm.$^2$, a bending strength of 11.3 kp./cm.$^2$, an impact strength of 0.27 cm. kp./cm.$^2$ and a notched bar impact strength of 0.16 cm. kp./cm.$^2$.

Samples of this foamed copolymer remain completely unaltered after 14-day storage followed by heating for eight hours at 50° C. in water, 2% aqueous sodium hydroxide solution, 2% aqueous sulfuric acid, methanol, isopropanol, acetone, methylisobutyl ketone, chloroform, carbon tetrachloride, ethyl acetate, benzine and benzene.

A similarly prepared copolymer wherein the triallylcyanurate was omitted and only seven instead of ten p.b.w. urea were added produced a foam having a density of 40 g.p.l., thermal stability to 200° C., a tensile strength of 8.7 kp./cm.$^2$, a bending strength of 4.7 kp./cm.$^2$ and a notched bar impact strength of 0.10 cm. kp./cm.$^2$.

EXAMPLE 2

After addition of 0.2 p.b.w. azoisobutyronitrile, a mixture of 55 p.b.w. methacrylonitrile, 45 p.b.w. methacrylic acid, 0.2 p.b.w. glycol dimethacrylate and 10 p.b.w. urea is copolymerized in fifty hours at 50° C. and tempered for three hours at 100° C. This copolymer foams upon heating to 200° C. for two hours.

EXAMPLE 3

5.5 p.b.w. urea, 5.5 p.b.w. polyvinylbutyral and 0.2 p.b.w. dibenzoyl peroxide are dissolved in a mixture of 55 p.b.w. methacrylonitrile, 45 p.b.w. methacrylic acid, 10 p.b.w. n-butylmethacrylate and 1 p.b.w. N-isobutoxymethyl-methacrylamide. A foamable copolymer is obtainable by heating this mixture for 24 hours to 60° C. and tempering for four hours at 100° C.

Plates of this copolymer foam upon heating for one hour to 235° C. followed by heating for an additional hour at 180° C. to a foamed body having a density of 0.068 kg./l., thermal stability in excess of 250° C., shearing strength of 27 kp./cm.$^2$, compression strength of 11.5 kp./cm.$^2$, tensile strength of 18 kp./cm.$^2$, bending strength of 21.5 kp./cm.$^2$, impact strength of 0.48 cm. kp./cm.$^2$. and notched bar impact strength of 0.16 cm. kp./cm.$^2$.

These foamed bodies are unaltered by four weeks storage in water, ethanol, isopropanol, acetone, ethyl acetate and benzene.

EXAMPLE 4

5.5 p.b.w. urea, 5.5 p.b.w. polyvinylbutyral, 1.1 p.b.w. of a melamine-formaldehyde precondensate and 0.2 p.b.w. dibenzoyl peroxide are dissolved in a mixture of 55 p.b.w. methacrylonitrile, 45 p.b.w. methacrylic acid and 10 p.b.w. n-butylmethacrylate. The copolymer prepared by heating this mixture for 24 hours to 60° C. for three hours to 100° C. foams to a foamed body having excellent stability to water and solvents and a density of about 0.06 kg./l. upon heating for one hour to 220° C. and tempering for an additional hour at 180° C.

What is claimed is:

1. In a process for preparing a heat-foamable thermoplastic copolymer which comprises partially copolymerizing, at a temperature from about 20° C. to 100° C., in the presence of 3 to 20% by weight urea or dimethylurea and a catalytically effective amount of an organic radical-forming catalyst, a monomer mixture consisting essentially of (A) 10 to 60% by weight acrylic acid, methacrylic acid or a combination thereof with (B) 20 to 60% by weight of acrylonitrile, acrylamide, methacrylonitrile, methacrylamide or a combination thereof, to form a solid copolymer in which unpolymerized monomer is dissolved, and then completing the polymerization by heating said solid copolymer for about one to four hours at a temperature from about 100° C. to 120° C. to form a thermoplastic unfoamed copolymer, the improvement which comprises adding to the monomer mixture, before copolymerization, from about 0.01 to about 10% by weight of a cross-linking agent selected from the group consisting of lower alkylol ether-acrylamides and -methacrylamides.

2. The process as in claim 1 wherein said cross-linking agent is employed in a concentration between about 0.01 and 3 percent by weight.

3. The process as in claim 1 wherein said cross-linking agent is N-isobutoxymethyl methacrylamide.

4. A foamable copolymer prepared by the process of claim 1.

5. In a process for preparing a heat-foamable thermoplastic copolymer which comprises partially copolymerizing, at a temperature of from about 20° to 100° C., in the presence of 3 to 20 percent by weight urea or dimethylurea and a catalytically effective amount of an organic radical-foaming catalyst, a monomer mixture comprising (A) 10 to 60 percent by weight acrylic acid, methacrylic acide or a combination thereof with (B) 20 to 60 percent by weight acrylonitrile, acrylamide methacrylonitrile, methacrylamide or a combination thereof and (C) up to about 60 percent by weight of another monomer or other monomers copolymerizable with comonomers A or B, to form a solid copolymer in which unpolymerized monomer is dissolved, and then completing the polymerization by heating said solid copolymer for about one to four hours at a temperature from about 100° C. to 120° C. to form a thermoplastic unfoamed copolymer, the improvement which comprises adding to the monomer mixture, before copolymerization, from about 0.01 to about 10% by weight of a cross-linking agent selected from the group consisting of lower alkylol ether-acrylamides and -methacrylamides.

6. In a process for preparing a heat foamed, stable copolymer which comprises partially copolymerizing, at a temperature from about 20° C. to 100° C., a monomer mixture consisting essentially of (A) 10 to 60 percent by weight of acrylic acid, methacrylic acid or a combination thereof and (B) 20 to 60 percent by weight acrylonitrile, acrylamide, methacrylonitrile, methacrylamide or a combination thereof, with 3 to 20 percent by weight urea or dimethylurea in the presence of a catalytically effective amount of an organic radical-foaming catalyst to form a solid copolymer in which unpolymerized monomer is dissolved, completing the polymerization by heating said solid copolymer for about one to four hours at a temperature from about 100° C. to 120° C. to form a thermoplastic unfoamed copolymer, and then foaming said unfoamed copolymer by heating it to a temperature of the order of about 180 to 250° C., the improvement which comprises adding to the monomer mixture, before copolymerization, from about 0.01 to about 10 percent by weight of a cross-linking agent selected from the group consisting of lower alkylol ether-acrylamides and -methacrylamides.

7. The process as in claim 6 wherein said cross-linking agent is employed in a concentration between about 0.01 and 3 percent by weight.

8. The process as in claim 6 wherein said cross-linking agent is N-isobutoxymethyl methacrylamide.

9. A foamed copolymer prepared by the process of claim 6.

10. A process for preparing a heat-foamed, stable copolymer which comprises partially copolymerizing, at a temperature from about 20° C. to 100° C., a monomer mixture consisting essentially of (A) 10 to 60 percent by weight of acrylic acid, methacrylic acid or a combination thereof and (B) 20 to 60 percent by weight acrylonitrile, acrylamide, methacrylonitrile, methacrylamide or a combination thereof, with 3 to 20 percent by weight urea or dimethylurea in the presence of a catalytically effective amount of an organic radical-forming catalyst to form a solid copolymer in which unpolymerized monomer is dissolved, completing the polymerization by heating said solid copolymer for about one to four hours at a temperature from about 100° C. to 120° C. to form a thermoplastic unfoamed copolymer, and then foaming said unfoamed copolymer by heating it to a temperature of the order of about 180 to 250° C., the improvement which comprises adding to the monomer mixture, before copolymerization, from about 0.01 to about 10 percent by weight of a cross-linking agent selected from the group consisting of lower alkoylol ether-acrylamides and -methacrylamides.

References Cited
UNITED STATES PATENTS

| | | | |
|---|---|---|---|
| 3,489,700 | 1/1970 | Kanai et al. | 260—2.5 N |
| 3,240,740 | 3/1966 | Knapp et al. | 260—29.6 HN |
| 3,558,530 | 1/1971 | Schroder et al | 260—2.5 N |

MURRAY TILLMAN, Primary Examiner

W. J. BRIGGS, SR., Assistant Examiner

U.S. Cl. X.R.

260—2.5 HB, 80.73, 80.76, 80.8, 874, 898, 851

UNITED STATES PATENT OFFICE
CERTIFICATE OF CORRECTION

Patent No. 3,708,444       Dated January 2, 1973

Inventor(s) Ganzler et al.

It is certified that error appears in the above-identified patent and that said Letters Patent are hereby corrected as shown below:

In the Heading:

After "assignors to" replace "Rohm & Haas G.m.b.H." by --Rohm G.m.b.H.--

Signed and sealed this 8th day of April 1975.

(SEAL)
Attest:

RUTH C. MASON
Attesting Officer

C. MARSHALL DANN
Commissioner of Patents
and Trademarks